United States Patent [19]

Toyoguchi et al.

[11] 4,271,242
[45] Jun. 2, 1981

[54] ACTIVE MATERIAL FOR POSITIVE ELECTRODE OF BATTERY

[75] Inventors: Yoshinori Toyoguchi, Osaka; Takashi Iijima, Hirakata; Masataro Fukuda, Toyonaka, all of Japan

[73] Assignee: Matsushita Electric Industrial Co., Ltd., Japan

[21] Appl. No.: 103,475

[22] Filed: Dec. 14, 1979

Related U.S. Application Data

[63] Continuation of Ser. No. 916,528, Jun. 19, 1978, abandoned.

[30] Foreign Application Priority Data

Jun. 24, 1977 [JP] Japan .................................. 52-75763

[51] Int. Cl.³ ............................................. H01M 6/14
[52] U.S. Cl. ..................................... 429/194; 429/218
[58] Field of Search ............... 429/209, 218, 194; 252/502; 204/294; 423/414, 439; 260/653, 653.9

[56] References Cited

U.S. PATENT DOCUMENTS

| | | |
|---|---|---|
| 3,536,532 | 10/1970 | Watanabe et al. .................. 429/194 |
| 3,567,618 | 3/1971 | Foulletier et al. ............... 429/218 X |
| 3,700,502 | 10/1972 | Watanabe et al. ...................... 136/6 |
| 3,929,920 | 12/1975 | Komo ............................... 423/439 X |
| 3,956,018 | 5/1976 | Kozawa ........................... 429/218 X |
| 4,036,786 | 7/1977 | Tiedemann ...................... 252/502 X |
| 4,061,600 | 12/1977 | Moore et al. .................... 252/502 X |

Primary Examiner—Charles F. LeFevour
Attorney, Agent, or Firm—Stevens, Davis, Miller & Mosher

[57] ABSTRACT

An improved active material for the positive electrode of a battery comprising carbon fluoride obtained by fluorinating carbon having a lattice constant of 3.40–3.50 Å in its (002) plane. The carbon is selected from among petroleum cokes and coal cokes. The resulting battery has excellent discharge and shelf life characteristics.

1 Claim, 9 Drawing Figures

ACTIVE MATERIAL FOR POSITIVE ELECTRODE OF BATTERY

This is a continuation of application Ser. No. 916,528 filed June 19, 1978, now abandoned.

This invention relates to an improvement in fluorinated carbon used as the active material for the positive electrode of a battery and more particularly to the positive electrode active material of fluorinated carbon which can make the discharge and shelf life characteristics of the battery excellent.

The positive electrode active material of fluorinated carbon is used in combination with a lithium negative electrode to provide a battery of high energy density, as is well-known in the field of the art. Fluorinated carbon or carbon fluoride is obtained by causing fluorine gas to react on crystalline carbon such as graphite or amorphous carbon. The battery using carbon fluoride of crystalline carbon is considered to be superior in, for example, discharge characteristic to that using carbon fluoride of amorphous carbon. However, the battery using carbon fluoride made of graphite has an inferior discharge utility factor and in the case where amorphous carbon is used to produce carbon fluoride, the carbon fluoride of active carbon provides a low discharge utility factor while the carbon fluoride of petroleum coke gives a high discharge utility factor. Namely, the property of carbon fluoride varies depending on the kind of carbon used to produce the carbon fluoride.

As a result of the Inventors' detailed investigation into the properties, i.e. physical indices, of carbons to be used as carbon fluorides and especially into the degree of crystallization, it has been found that the carbon fluoride obtained by fluorinating carbon having a lattice constant of 3.40–3.50 Å in (002) planes can provide a battery having an excellent shelf life characteristic and an excellent discharge characteristic inclusive of discharge utility factor.

It is therefore one object of this invention to provide positive electrode active material of carbon fluoride which can improve the discharge and shelf life characteristics of a battery.

Other objects, features and advantages of the present invention will be readily apparent from the detailed descriptions taken in conjunction with the accompanying drawings, in which.

Figure 5:
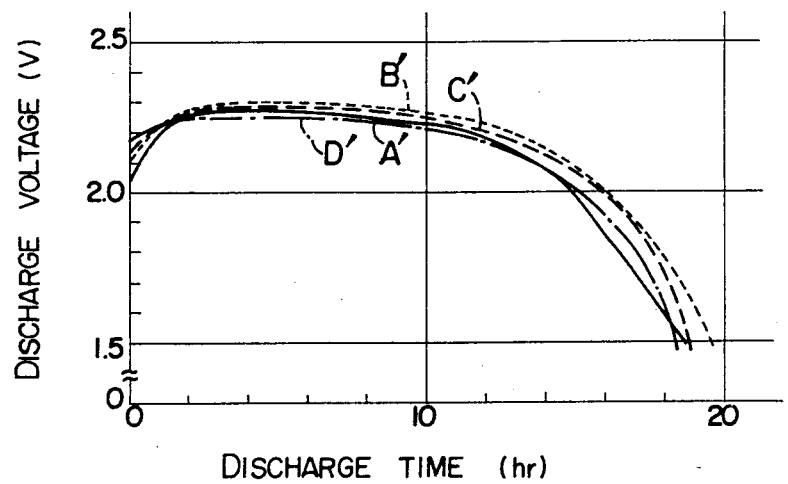
Figure 6:
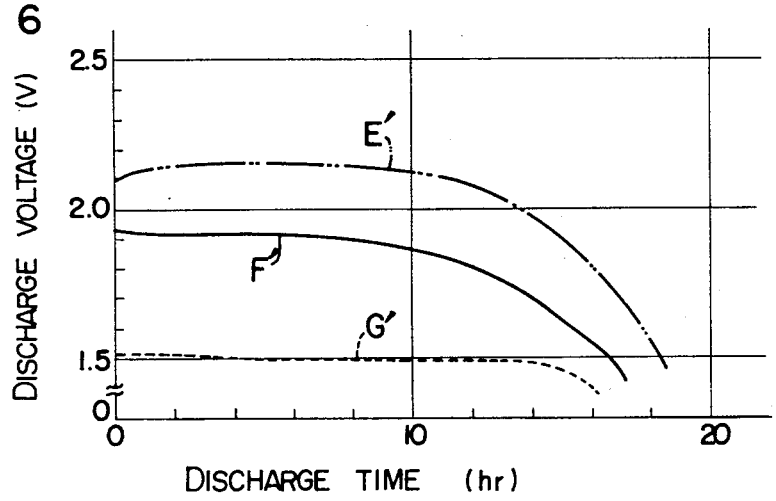
Figure 7:
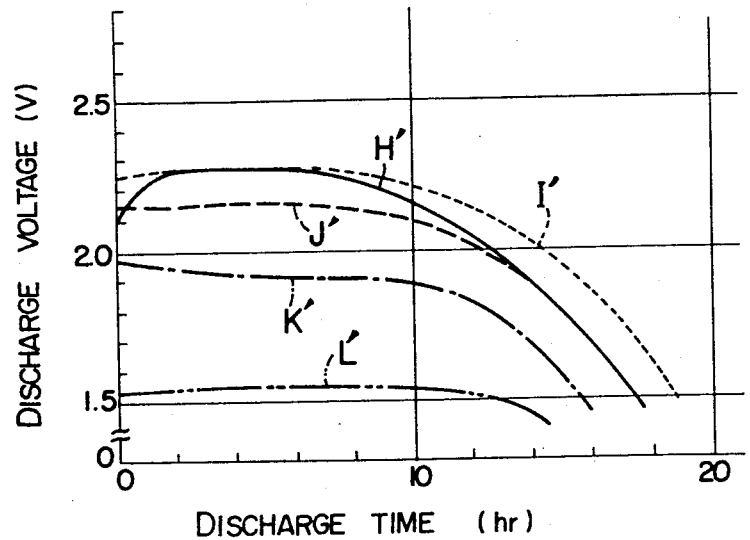
Figure 8:
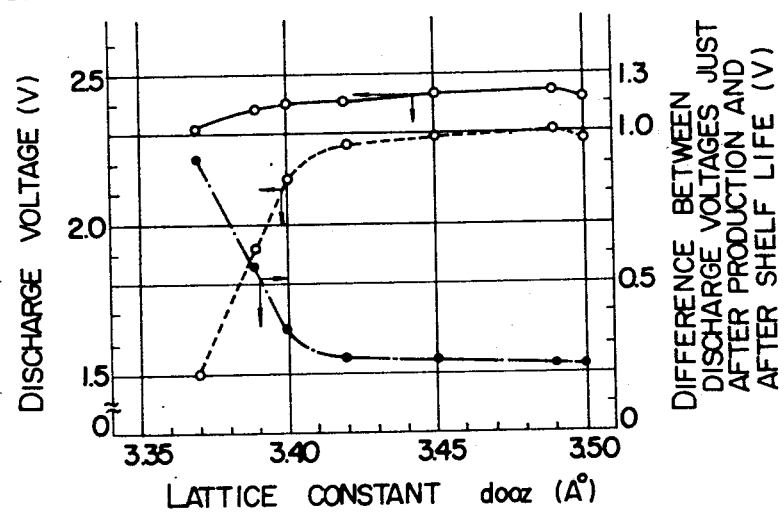
Figure 9:
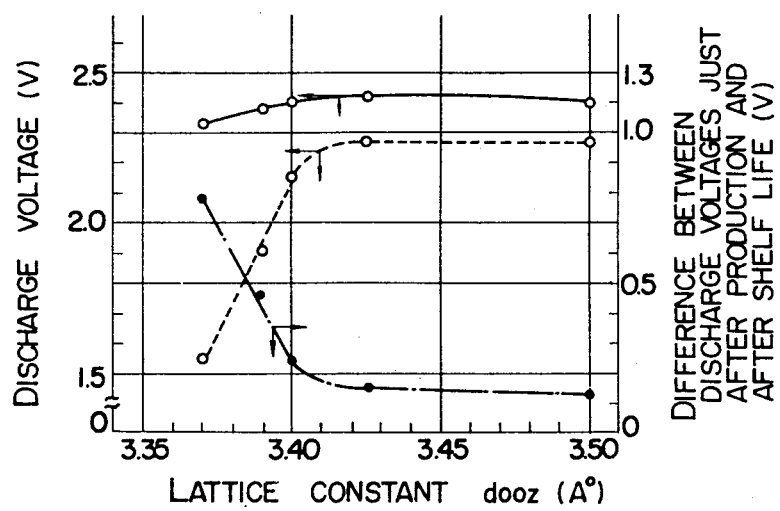

FIGS. 5 to 7 show for comparison the discharge characteristics of batteries using several kinds of carbon fluorides, measured after a certain shelf life; and FIGS. 8 and 9 show the relationships between the discharge characteristics of batteries measured just after the production thereof and after a certain shelf life and the lattice constants $d_{002}$ of the carbons used as the carbon fluorides in the batteries.

Figure 1:
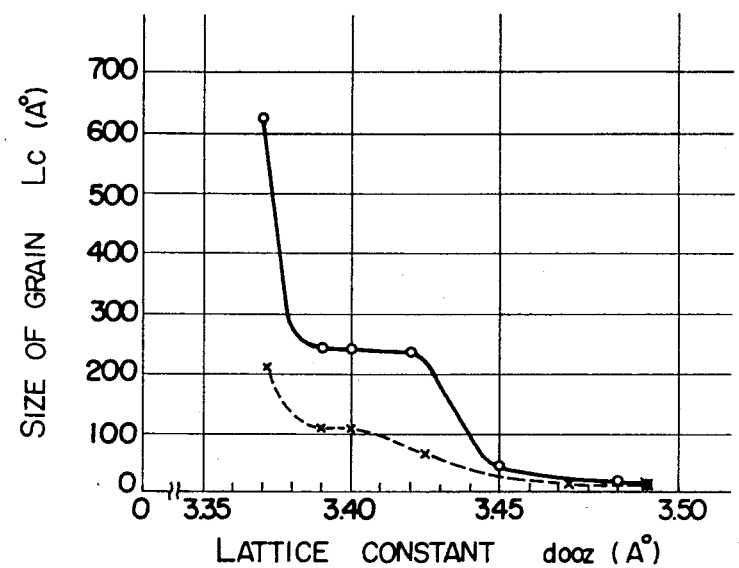
FIG. 1 shows the relationships between the lattice constant in (002) planes of petroleum coke and the size $L_c$ of the crystal grain in the direction along the c axis perpendicular to the (002) planes and between the lattice constant in (002) planes of coal coke and the size $L_c$ of the crystal grain in the same direction.

As amorphous carbon are known petroleum coke, coal coke, acetylene black and active carbon, whose degrees of crystallization can be considerably improved by heat treatment. FIG. 1 shows the relationships between the lattice constants $d_{002}$ in (002) planes of petroleum coke and coal coke as Yttman coal and the sizes $L_c$ of the crystal grains in the direction along the c axis perpendicular to the (002) planes. In FIG. 1, the solid curve corresponds to the petroleum coke and the dashed curve to the coal coke. The carbon having a small lattice constant $d_{002}$ was obtained by heat-treatment of the carbon having a large lattice constant $d_{002}$.

As shown in FIG. 1, even amorphous carbons have different degrees of crystallization if their lattice constants are different. Especially where the lattice constant $d_{002}$ is less than 3.39 Å, the size of a crystal grain takes remarkably different values, this indicating that crystallization is taking place. Here, for the sake of distinction, carbon having a lattice constant $d_{002}$ of 3.39 Å and over is termed as amorphous carbon while carbon having a lattice constant $d_{002}$ of less than 3.39 Å is referred to as crystalline carbon.

A battery using as its positive electrode carbon fluoride made of graphite ($d_{002} = 3.36$ Å) which belongs to the category of crystalline carbon as described above, has an excellent discharge voltage characteristic but has a low discharge utility factor of about 50%. On the other hand, a battery using as its positive electrode carbon fluoride made of active carbon such as charcoal had a discharge utility factor of 60%. Such active carbon or carbon black as used above is so amorphous that X-rays diffracted from the (002) planes exhibit no diffraction peak. However, in the case where petroleum coke or coal coke is used which gives rise to diffraction peaks of the X-rays diffracted by the (002) planes, a battery having a discharge utility factor of more than 90% can be obtained. Thus, the carbon fluoride made of amorphous carbon in which crystallization has proceeded to a certain extent, contributes much to the improvement in the discharge characteristic while the carbon fluoride made of charcoal or acetylene black is causative of a low discharge characteristic.

It is understood from the above description that the degree of crystallization is the most important factor in the case where amorphous carbon is used as a raw material for carbon fluoride. Also, it is apparent from the example of graphite that such carbon as having too high or low a degree of crystallization is unsuitable for a raw material as carbon fluoride.

This invention will now be described in detail by way of embodiment.

(1) Carbon as raw material

Seven kinds of petroleum cokes and five kinds of coal cokes all having different lattice constants $d_{002}$ are used as raw materials for carbon fluorides and for comparison graphite as crystalline carbon and acetylene black and charcoal as amorphous carbon are used.

Table I given below shows the lattice constants in the (002) planes of these kinds of carbons, measured by X-ray diffraction.

TABLE I

| Raw material | Symbol | Lattice constant $d_{002}$ (Å) | Symbol of resultant carbon fluoride |
|---|---|---|---|
| Petroleum coke | A | 3.50 | A' |
| | B | 3.49 | B' |
| | C | 3.45 | C' |
| | D | 3.42 | D' |
| | E | 3.40 | E' |
| | F | 3.39 | F' |
| | G | 3.37 | G' |

TABLE I-continued

| Raw material | Symbol | Lattice constant d002 (Å) | Symbol of resultant carbon fluoride |
|---|---|---|---|
| | H | 3.50 | H' |
| Coal coke | I | 3.42 | I' |
| | J | 3.40 | J' |
| | K | 3.39 | K' |
| | L | 3.37 | L' |
| Graphite | M | 3.35 | M' |
| Acetylene black | N | — | N' |
| Charcoal | O | — | O' |

The petroleum cokes D, E, F and G are obtained by subjecting the petroleum coke C to heat treatment in vacuum at 1600° C., 1900° C., 2000° C., and 2900° C., respectively. The coal cokes I, J, K and L are obtained by the heat treatment of the coal coke H at 1800° C., 2200° C., 2800° C. and 3150° C., respectively.

(2) Production of carbon fluoride

By heating the above kinds of carbons as raw materials at 400° C. for 4 hours in an atmosphere consisting of fluorine and nitrogen in the proportion of 1:1, the corresponding carbon fluorides are produced. With respect to the graphite M, however, the heat treatment is performed for 8 hours since in this case the reaction for producing carbon fluoride proceeds slowly.

(3) Constitution of test battery

For the comparison of performance, an organic electrolytic battery having the following constitution is used.

First, the positive electrode is formed as follows. Acetylene black, which is electrically conductive, 7 g, is mixed with carbon fluoride, 100 g. A wetting agent of methanol, 80 cc, is dispersed with a binding agent of ethylene tetrafluoride-propylene hexafluoride copolymer 13 g and the dispersed liquid is mixed to form a paste-like substance. A positive electrode plate is then formed by applying the paste-like substance on a titanium-expanded metal mesh as an electric collector and by press-shaping the substance under a roller so that the layer of the pressed substance may have a thickness of 0.9 mm and a weight of 0.11 g per 1 cm². The thus produced positive electrode plate is dried up in air at 90° C. Thereafter, a plate of 80×12 mm is cut out and the mixture layer at the end of the plate is removed to expose the titanium-expanded metal. A titanium ribbon as a lead is spot-welded to the exposed surface of the titanium-expanded metal. Then, a nonwoven fabric separator of polypropylene is wound about the plate to form a double layer thereof and the plate with a double layer of polypropylene thereon is desiccated at 80° C. in vacuum.

On the other hand, a negative electrode is formed by press-fastening to a lithium plate of 85×11×0.6 mm a net with a nickel ribbon as a lead spot-welded to its end. The thus formed negative electrode and the previously finished positive electrode are put together with one laid upon another and the piled electrodes are formed in a spiral and placed in a cell case of iron. The negative electrode lead is spot-welded to the iron cell case and the positive electrode lead is spot-welded to a titanium plate used as a sealing plate. The iron cell case is filled through vacuum impregnation with a solution of γ-butylolactone with lithium borofluoride $LiBF_4$ dissolved therein at a concentration of 1 mcl/l. A gasket of butyl chloride gum is interposed between the sealing plate and the cell case and then a liquid-tight sealing is completed by caulking.

The theoretical capacity of the battery produced by the above described procedure was 770 mAh where petroleum coke, graphite, acetylene black or charcoal is used as a raw material for carbon fluoride and 750 mAh where coal coke is used which is rich in ash contact. Concerning the packing capacity of the battery, the positive electrode is smaller in packing capacity than the negative electrode so as to manifest the influence by the carbon fluoride forming the positive electrode.

(4) Comparison of characteristics of batteries

Figure 2:
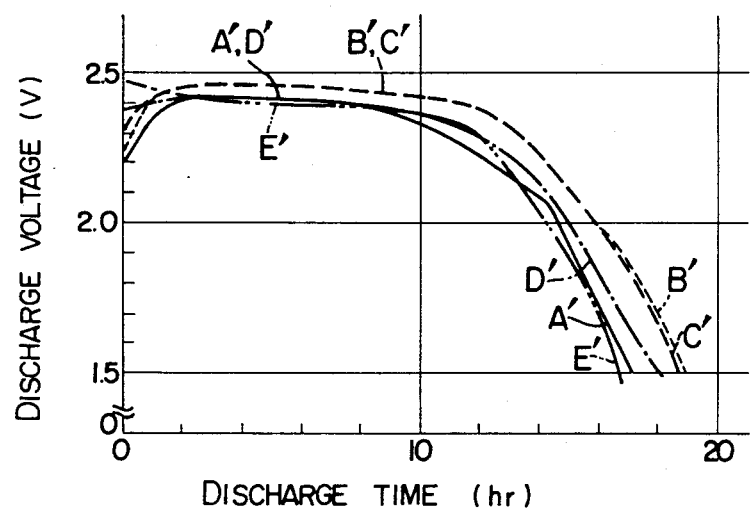
FIGS. 2 to 4 show for comparison the discharge characteristics of batteries using several kinds of carbon fluorides, measured just after the production of the batteries.
Figure 3:
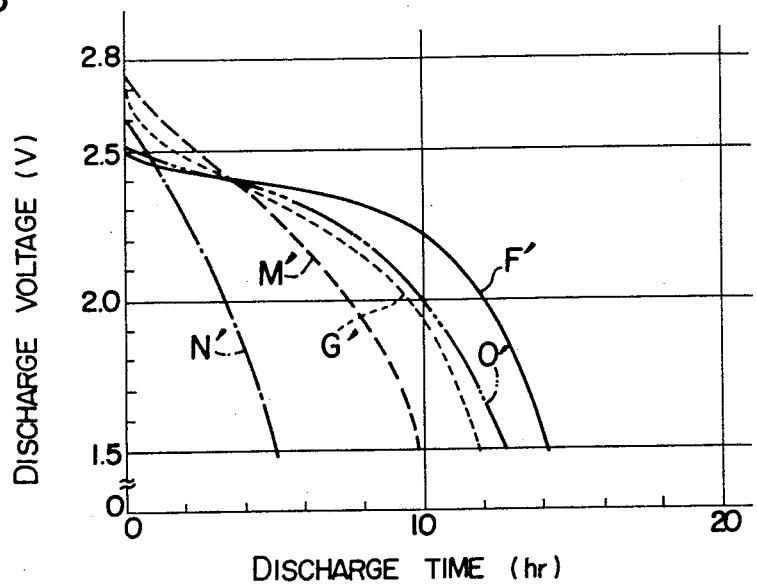
Figure 4:
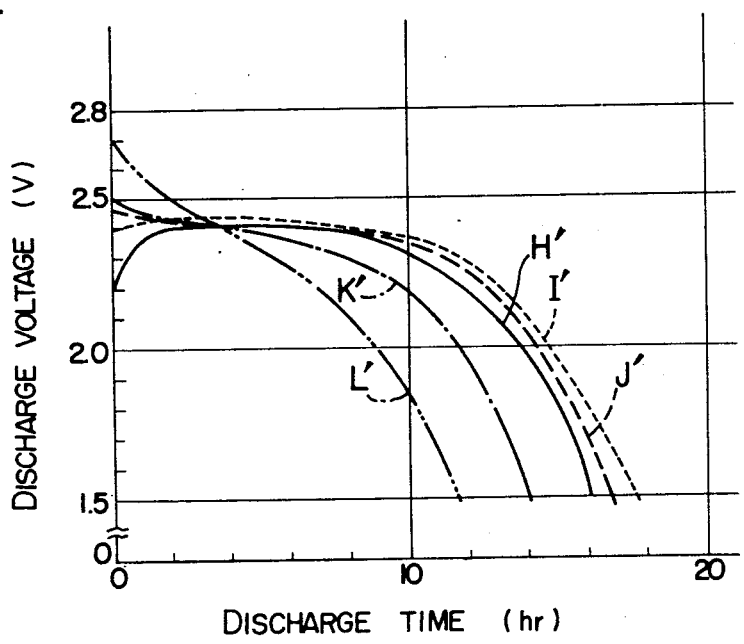

FIGS. 2 to 4 show the discharge characteristics of batteries, which are plotted by discharging the respective batteries kept at 20° C. just after the completion thereof, with a resistor of 60 Ω as a load. Table II given below lists the discharge voltages after 5 hours since the start of discharging and the discharge capacities and utility factors when the discharge is stopped with a terminating voltage of 1.5 V. In the figures and the table, the symbols A'-O' indicate respectively batteries using the corresponding carbon fluorides A'-O'.

TABLE II

| Kinds of batteries | Voltage after 5 hours since the start of discharging (V) | Discharge capacity (with a terminating voltage of 1.5 V) (mAh) | Utility factor(%) |
|---|---|---|---|
| A' | 2.41 | 635 | 82 |
| B' | 2.44 | 706 | 92 |
| C' | 2.44 | 703 | 91 |
| D' | 2.41 | 681 | 88 |
| E' | 2.40 | 652 | 85 |
| F' | 2.38 | 537 | 70 |
| G' | 2.32 | 439 | 57 |
| H' | 2.40 | 608 | 81 |
| I' | 2.42 | 665 | 89 |
| J' | 2.40 | 628 | 84 |
| K' | 2.38 | 520 | 69 |
| L' | 2.33 | 425 | 57 |
| M' | 2.27 | 353 | 46 |
| N' | 1.50 | 173 | 22 |
| O' | 2.35 | 434 | 56 |

As apparent from FIGS. 2 to 4 and the table II, if graphite, acetylene black or charcoal is used as a raw material for carbon fluoride forming the positive electrode active material, the discharge capacity and utility factor are both small. It is also seen that if petroleum coke or coal coke is used for the same purpose, both discharge capacity and utility factor are large. In particular, they become maximum when the lattice constant $d_{002}$ is 3.49–3.42 Å, but decrease when $d_{002}$ becomes greater or smaller than the range of these values. With respect to the carbon fluorides (G', L') using petroleum coke and coal coke whose lattice constants $d_{002}$ are small, the discharge voltage at the beginning of discharging is high, but the utility factor is small so that the flat characteristic of the discharging curve is degraded, the discharging curve resembling that for the carbon fluoride M' using graphite.

As described above, among the crystalline carbon such as graphite and the amorphous carbon such as acetylene black, charcoal, petroleum coke and coal coke, which are to be used as raw materials for carbon fluoride as positive electrode active material for a battery, the petroleum coke or the coal coke having a lattice constant $d_{002}$ of 3.50–3.40 Å is best used to obtain the highest discharge characteristic. In the case of the petroleum or coal coke having a lattice constant $d_{002}$ of more than 3.50 Å, the degree of crystallization of carbon becomes very low so that the discharge characteristic obtained in this case almost equals that obtained with acetylene black.

Next, the result of the investigation into the shelf life characteristics of batteries using carbon fluorides (A'–L') made of petroleum and coal cokes will be described.

FIGS. 5 to 7 show the discharge curves for the above batteries, the curves being plotted by discharging the batteries at 20° C. with a resistor of 60 Ω as a load after a shelf life at 45° C. for 6 months. Table III given below lists the discharge voltages after 5 hours since the start of discharging, the discharge capacities when the discharge is stopped with a terminating voltage of 1.5 V, and the utility factors under the same discharge conditions as above. As apparent from the figures and table, the batteries A'–E' and H'–J' have good shelf life characteristics.

TABLE III

| Kinds of batteries | Voltage after 5 hours since the start of discharging (V) | Discharge capacity (with a terminating voltage of 1.5 V) (mAh) | Utility factor (%) |
|---|---|---|---|
| A' | 2.28 | 635 | 82 |
| B' | 2.31 | 695 | 90 |
| C' | 2.29 | 690 | 90 |
| D' | 2.36 | 659 | 86 |
| E' | 2.15 | 631 | 82 |
| F' | 1.92 | 519 | 67 |
| G' | 1.50 | 201 | 26 |
| H' | 2.27 | 606 | 81 |
| I' | 2.27 | 653 | 87 |
| J' | 2.15 | 607 | 81 |
| K' | 1.91 | 488 | 65 |
| L' | 1.55 | 329 | 44 |

FIGS. 8 and 9 show the relationships between the discharge voltages after 5 hours since the beginning of discharging, listed in the tables II and III, and the lattice constants $d_{002}$ of carbons used as raw materials for carbon fluorides, FIG. 8 corresponding to the cases where petroleum cokes are used as raw materials for carbon fluorides and FIG. 9 to the case where coal cokes are used to form carbon fluorides.

In these figures, solid curves represent the characteristics of batteries just after the production thereof, dashed curves corresponds to those observed after a shelf life at 45° for 6 months and long-and-short-dash curves represents the differences between the discharge voltages of the batteries just after the production thereof and the discharge voltages of the batteries after a shelf life at 45° C. for 6 months, that is, the degradations of discharge voltages due a period of shelf life.

As apparent from FIGS. 8 and 9, if petroleum cokes A, B, C, D and E or coal cokes H, I, and J are used as raw materials for carbon fluorides as positive electrode active materials for batteries, excellent shelf life characteristics can be obtained.

As described above, by using as positive electrode active materials for batteries the carbon fluorides formed by fluorinating the petroleum cokes or coal cokes having lattice constants of 3.40–3.50 Å, the completed batteries can enjoy excellent discharge characteristics such as flat characteristic of discharge voltage, discharge capacity, utility factor and shelf life characteristic.

The relationship between the lattice constants $d_{002}$ of the petroleum or coal cokes and the sizes $L_c$ of the crystal grains thereof, is as shown in FIG. 1. Here, the constants $d_{002}$ and the sizes $L_c$ were obtained by the X-ray diffraction using the Kα line of copper Cu. Namely, the lattice constants $d_{002}$ were calculated from a Bragg's equation:

$$2d \sin \theta = n\lambda \qquad (1)$$

where d is the lattice constant, $\theta$ the diffraction angle, $\lambda$ the wavelength of the Kα line and n the positive integers.

The size $L_c$ of crystal grain was obtained by measuring the distribution of the diffraction peaks caused by the X-rays diffracted by the (002) planes. Namely, the size $L_c$ was calculated from a Scherrer equation:

$$L_c = K\lambda / \beta_{\frac{1}{2}} \cos \theta \qquad (2)$$

where $\beta_{\frac{1}{2}}$ is the half-value breadth (radian) of the diffraction peak and K is the shape factor, assumed in this case to be equal to 1.

It is seen from FIG. 1 that the change in the crystal structure of the petroleum coke somewhat resembles the change in the crystal structure of the coal coke. Namely, in the region where $d_{002}$ ranges from 3.50 Å to 3.42 Å, $L_c$ gradually increases with $d_{002}$; $L_c$ remains unchanged even when $d_{002}$ decreases, where $d_{002}$ lies within a range of 3.42–3.39 Å; and for less than 3.39 Å, $L_c$ changes largely with the decrease in $d_{002}$.

The rates at which the fluorinations of the petroleum and coal cokes A–L proceed, are such that $A \approx B \approx C \approx H > D \approx I > E \approx J > F \approx K > G \approx L$. Namely, the greater is the lattice constant $d_{002}$, the easier is the fluorination. This means that the greater is the distance between the adjacent lattice planes of carbon having laminated structure, the higher is the velocity of diffusion of fluorine atoms along the lattice planes. The reaction to take place at the positive electrode of a battery is considered to be given by the expression:

$$CF + Li^+ + e \rightarrow LiF + C \qquad (3)$$

From this expression, therefore, it seems that the higher is the velocity of the diffusion of fluorine atoms, the greater is the discharge utility factor. This estimation coincides with the result of actual measurement of discharge utility factors, given in the table II.

With the batteries using the carbon fluorides F', G', K' and L' made of the petroleum cokes F and G and the coal cokes K and L, the discharge voltage in the initial stage of discharge is high and the degradation of the discharge voltage due to shelf life is remarkable. It seems that in the fluorination of these kinds of cokes fluorine atoms are first adsorbed onto the surface of the carbon and that the fluorine atoms then diffuses in between the lattice planes of the carbon. In case of the carbon F, G, K or L in which the lattice constant $d_{002}$ is small, the diffusion of fluorine atoms is not so easy and therefore many fluorine atoms remain adsorbed on the surface of the carbon. Accordingly, the resultant carbon fluorides F', G', K' and L' contain a large quantity of adsorbed fluorine. According to the iodimetry for measuring the quantity of fluorine atoms adsorbed on carbon fluoride, it followed that  $G' \approx L' > > F' \approx K' > > E' \approx J' > D' > I' > C' \approx B' \approx A' \approx H'$.

Iodimetry is a method of measuring the quantity of adsorbed fluorine by causing the potassium iodide to react on the adsorbed fluorine of carbon fluoride and by measuring the quantity of iodine liberated. The reaction is such that $$2(C \ldots F) + KI \rightarrow 2KF + I_2 + 2C \qquad (4)$$

In the expression (4), the term (C ... F) indicates the fluorine adsorbed on the surface of carbon fluoride. The reason why the initial discharge voltages of the batteries using the carbon fluorides F', G', K' and L' are high, may be due to the contribution of the adsorbed fluorine to the battery reaction. In the batteries using the carbon fluorides F', G', K' and L', a considerable quantity of titanium fluoride was detected, after a certain shelf life, on the titanium-expanded metal used as the charge collector of the positive electrode. The titanium fluoride formed on the charge collector forms a resistance on the surface of the collector, which is positive of heat loss and therefore the degradation of the discharge voltage. The adsorbed fluorine atoms have a higher activity than the fluorine atoms which are covalently bonded with carbon atoms in the carbon fluoride and therefore generate a high discharge voltage while they form titanium fluoride by reacting on the titanium atoms of the charge collector during a certain shelf life. For this reason, carbon fluoride containing a smaller quantity of adsorbed fluorine must be used to obtain a battery having a satisfactory shelf life characteristic. So, carbon having a large lattice constant $d_{002}$ is needed to produce such carbon fluoride having a small quantity of adsorbed fluorine. Thus, by forming the positive electrode active material of carbon fluoride using petroleum or coal coke having a lattice constant $d_{002}$ of 3.40–3.50 Å, a battery having an excellent discharge and shelf life characteristics can be obtained.

What we claim is:

1. In a battery having a nonaqueous electrolyte, a fluorinated carbon cathode and a lithium anode, the improvement which comprises using as the cathode a carbon fluoride produced by fluorinating carbon having a lattice constant of 3.40 to 3.50 Å in its (002) planes.

* * * * *